United States Patent [19]
Brown et al.

[11] Patent Number: 5,898,366
[45] Date of Patent: Apr. 27, 1999

[54] SEAT BELT BUCKLE WITH HALL EFFECT LOCKING INDICATOR

[75] Inventors: Louis R. Brown, Oxford; Robert P. Ellis, Almont, both of Mich.

[73] Assignee: TRW Vehicle Safety Systems Inc., Lyndhurst, Ohio

[21] Appl. No.: 08/936,053

[22] Filed: Sep. 23, 1997

[51] Int. Cl.$^6$ .................... B60Q 1/00; B60R 21/00
[52] U.S. Cl. .................... 340/457.1; 340/551; 180/270; 24/633
[58] Field of Search ................ 340/457.1, 551, 340/552; 180/268, 270; 24/603, 633, 304

[56] References Cited

U.S. PATENT DOCUMENTS

| | | | |
|---|---|---|---|
| 3,147,819 | 9/1964 | Keleher | 180/268 |
| 3,766,612 | 10/1973 | Hattori | 200/61.58 B |
| 3,770,919 | 11/1973 | Lewis | 180/268 |
| 4,047,267 | 9/1977 | Lindblad | 14/27 |
| 4,103,842 | 8/1978 | Martin et al. | 200/61.58 B |
| 4,571,471 | 2/1986 | Haglund | 200/61.58 B |
| 4,785,906 | 11/1988 | Kang | 180/270 |
| 4,943,087 | 7/1990 | Sasaki | 280/804 |
| 5,060,977 | 10/1991 | Saito | 280/802 |
| 5,107,846 | 4/1992 | Atlas | 600/479 |
| 5,133,425 | 7/1992 | Han | 180/270 |
| 5,218,744 | 6/1993 | Saito | 24/633 |
| 5,233,732 | 8/1993 | Yamanishi | 24/303 |
| 5,406,252 | 4/1995 | Dear | 340/457.1 |
| 5,481,078 | 1/1996 | Asche | 200/85 A |
| 5,742,986 | 4/1998 | Corrion et al. | 24/633 |
| 5,752,299 | 5/1998 | Vivacqua et al. | 24/633 |

FOREIGN PATENT DOCUMENTS

| | | | |
|---|---|---|---|
| 212425 | 8/1984 | Germany | B60R 21/10 |
| 4214222 A1 | 4/1993 | Germany | B60R 21/16 |
| 2228183 | 8/1990 | United Kingdom | B60R 21/16 |

OTHER PUBLICATIONS

Research Disclosure 2244 (1996) Mar., No. 383 Emsworth, GB, XP 000581332, p. 193, 38333, "Seat Belt Buckle Switch".

Research Disclosure 2244 (1992) Dec., No. 344, Emsworth, GB, XP 00327165, p. 940, 34457, "Air Bag Inhibitor for Use with Infant Seat".

U.S. Appln. No. 08/900,344, filed Jul. 25, 1997, entitled "Method and Apparatus for Indicating the Locked or Unlocked Condition of a Seat Belt Buckle", Atty. Docket No. TRW(TE)3540 Pat. No. 5,774,612.

U.S. Appln. No. 08/800,263, filed Feb. 13, 1997, entitled "Seat Belt Buckle with Hall Effect Locking Indicator and Method of Use" Pat. No. 5,762,986.

U.S. Appln. No. 08/749,949, filed Nov. 14, 1996, entitled "Seat Belt Buckle with Field Effect Locking Indicator and Method of Use".

*Primary Examiner*—Jeffery A. Hofsass
*Assistant Examiner*—Van T. Trieu
*Attorney, Agent, or Firm*—Tarolli, Sundheim, Covell, Tummino & Szabo

[57] ABSTRACT

An apparatus includes a latch (42), an armature structure (64), and a spring structure (66). The latch (42) is movable from a non-locking position to a locking position in which the latch (42) engages a seat belt tongue (16). The armature structure (64) conducts magnetic flux from a magnet (62) to a Hall effect device (60). The spring structure (66) biases the armature structure (64) into sliding contact with the latch (42) during movement of the latch (42) between the non-locking and locking positions. The latch (42) affects the magnetic flux conducted by the armature structure (66) so as to cause the Hall effect device (60) to have a first output when the latch (42) is in the non-locking position and to have a second, different output when the latch (42) is in the locking position.

17 Claims, 4 Drawing Sheets

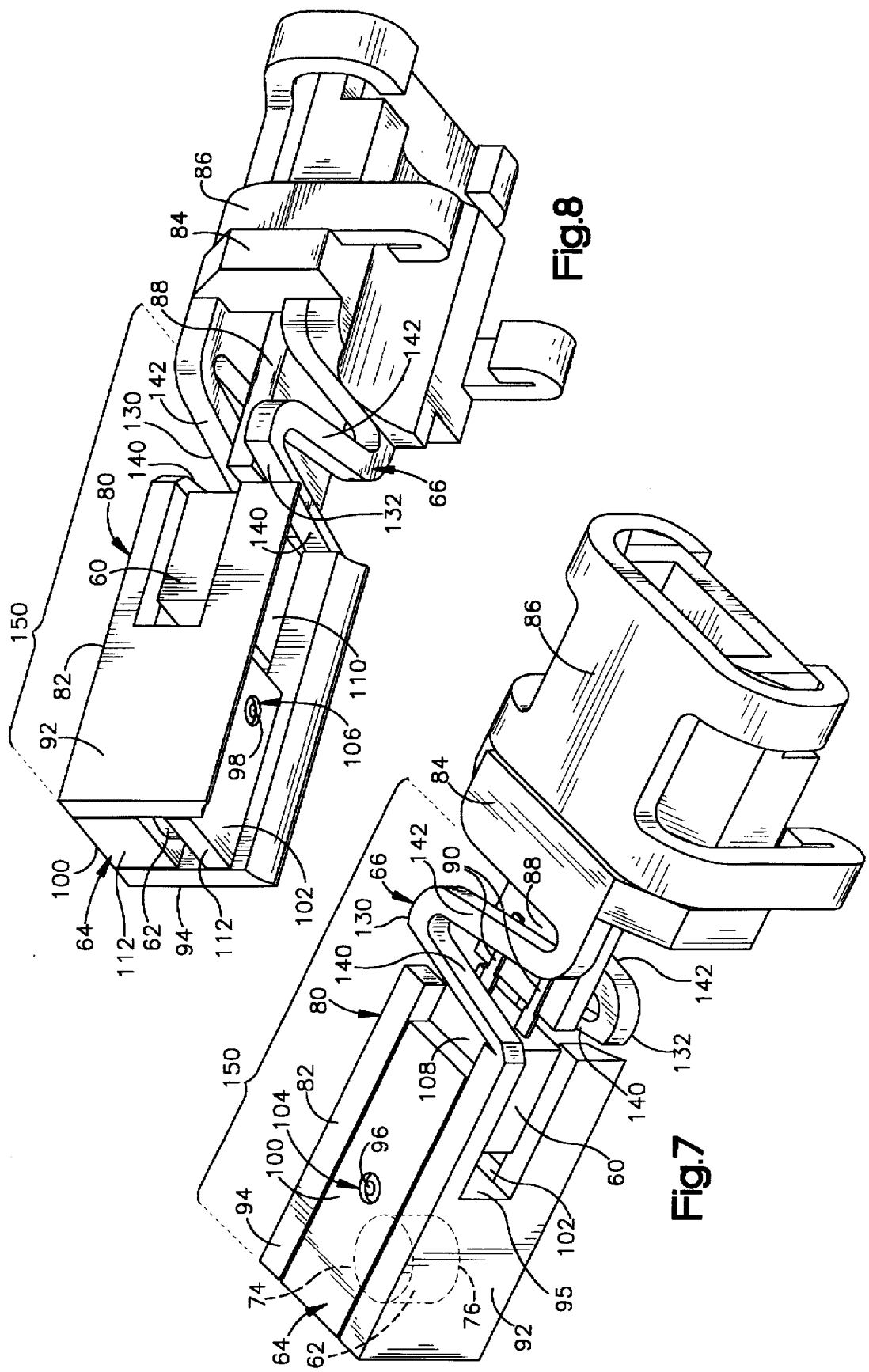

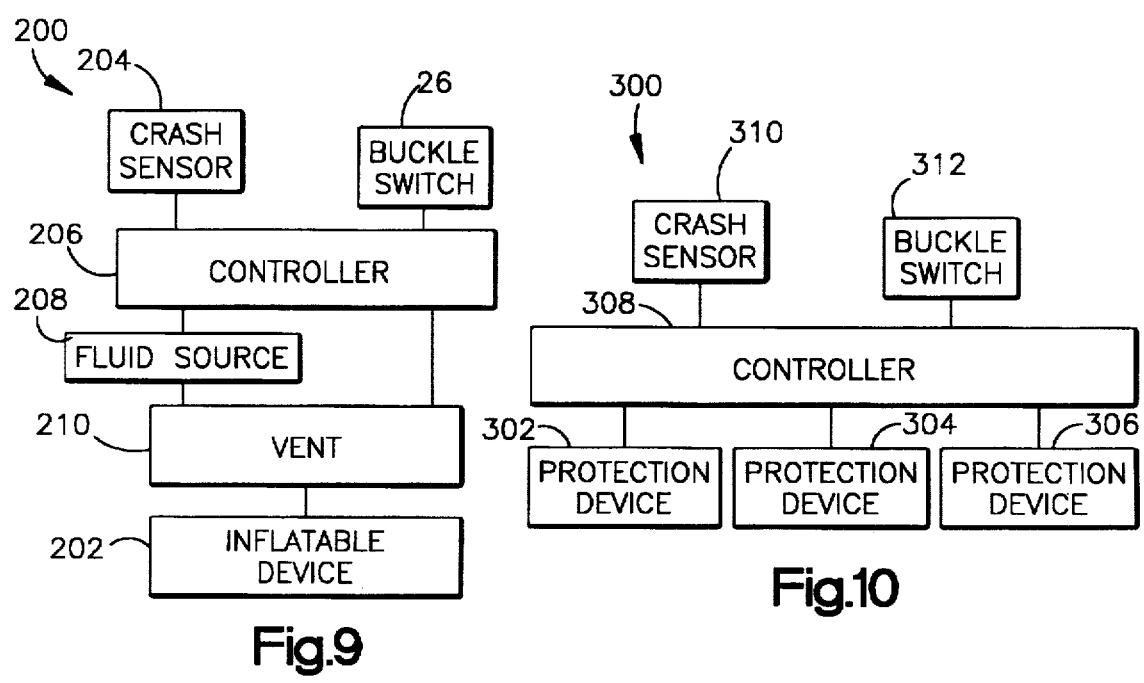

SEAT BELT BUCKLE WITH HALL EFFECT LOCKING INDICATOR

FIELD OF THE INVENTION

The present invention relates to a seat belt buckle.

BACKGROUND OF THE INVENTION

A seat belt system for restraining a vehicle occupant typically includes seat belt webbing, a seat belt locking tongue on the webbing, and a seat belt buckle. The tongue on the webbing is inserted in the buckle when the webbing has been placed about a vehicle occupant. A latch mechanism in the buckle interlocks with the tongue to secure the webbing about the occupant. Such a seat belt system may also include a buckle switch for indicating whether or not the tongue is locked in the buckle.

SUMMARY OF THE INVENTION

In accordance with the present invention, an apparatus comprises a latch, a Hall effect device, and a magnet. The latch is movable from a non-locking position to a locking position in which it engages a seat belt tongue. The apparatus further comprises an armature structure and a spring structure. The armature structure conducts magnetic flux from the magnet to the Hall effect device. The spring structure biases the armature structure into sliding contact with the latch during movement of the latch between the non-locking and locking positions.

An apparatus constructed in accordance with the present invention indicates whether or not the latch is engaged with a seat belt tongue. By holding the armature structure against the latch, the spring structure ensures that the latch can affect the magnetic flux conducted by the armature structure when the latch is in either the non-locking position or the locking position. This causes the Hall effect device to have a first output when the latch is in the non-locking position, and to have a second, different output when the latch is in the locking position.

BRIEF DESCRIPTION OF THE DRAWINGS

The foregoing and other features of the present invention will become apparent to one skilled in the art to which the present invention relates upon reading the following description of the invention with reference to the accompanying drawings, wherein:

FIG. 7 is an isometric view of parts of the apparatus of FIG. 1, including parts that are shown schematically in FIGS. 2–4;

FIG. 8 is a second isometric view of the parts shown in FIG. 7;

FIG. 9 is a block diagram of a deployment system including the apparatus of FIG. 1; and FIG. 10 is a block diagram of a vehicle occupant protection apparatus comprising a second embodiment of the present invention.

DESCRIPTION OF PREFERRED EMBODIMENT

Figure 1:
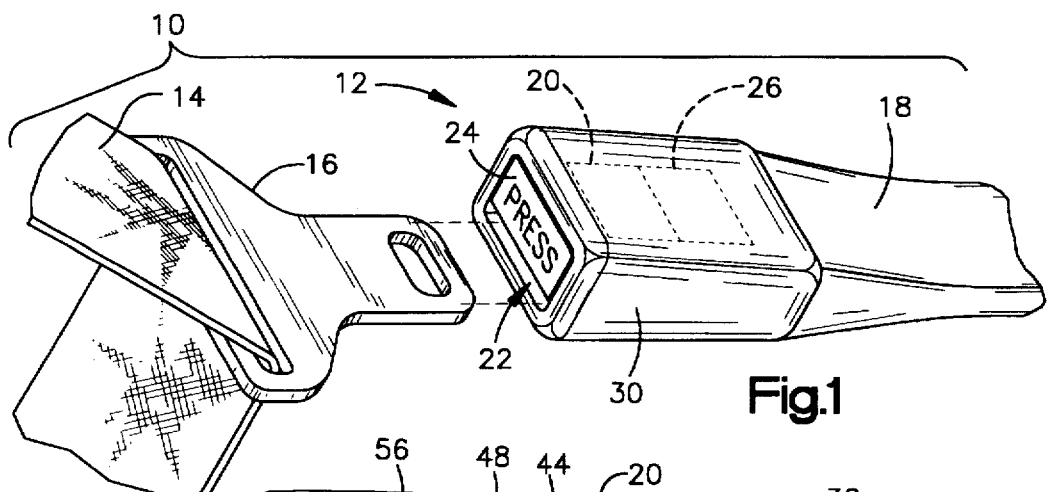
FIG. 1 is an isometric view of a vehicle occupant restraint apparatus comprising a first embodiment of the present invention.

A vehicle occupant restraint apparatus 10 comprising a first embodiment of the present invention is shown partially in FIG. 1. The apparatus 10 includes a seat belt buckle 12, seat belt webbing 14, and a seat belt tongue 16 on the webbing 14. The buckle 12 is anchored in a vehicle in a known manner, such as by a cable or anchor strap (not shown) extending within a cover 18. A latch mechanism 20 (shown schematically in FIG. 2) locks the tongue 16 in the buckle 12 when the tongue 16 is moved into an opening 22 at the end of the buckle 12. The tongue 16 is subsequently released from the buckle 12 upon depression of a pushbutton 24 adjacent to the opening 22. A buckle switch 26 (also shown schematically) indicates whether or not the tongue 16 is locked in the buckle 12.

Figure 2:
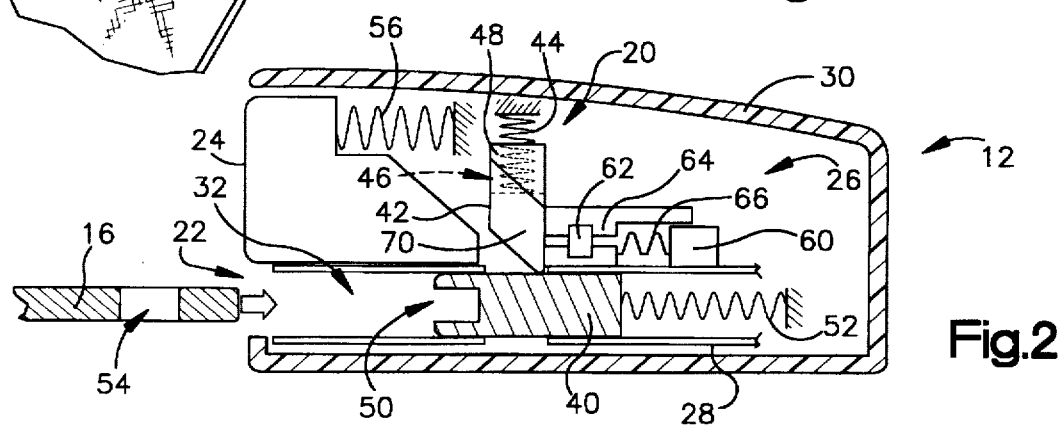
FIG. 2 is a side view, partly in section, of parts of the apparatus of FIG. 1, with certain parts being shown schematically.
Figure 3:
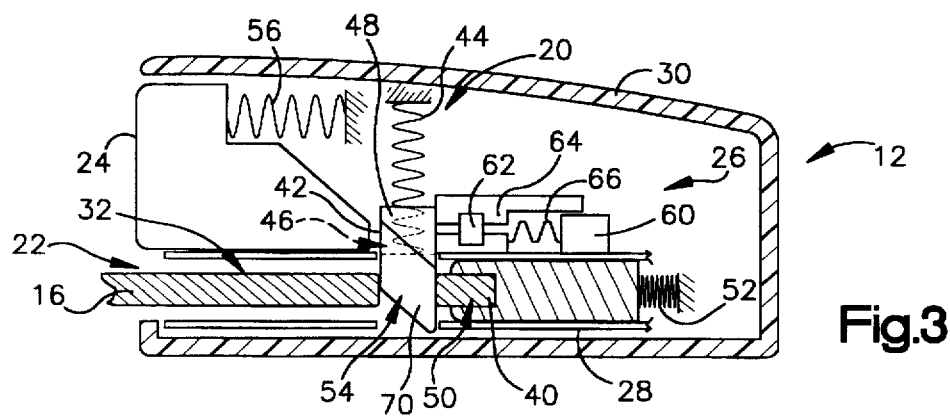
FIGS. 3 and 4 are views similar to FIG. 2 showing parts in different positions.
Figure 4:
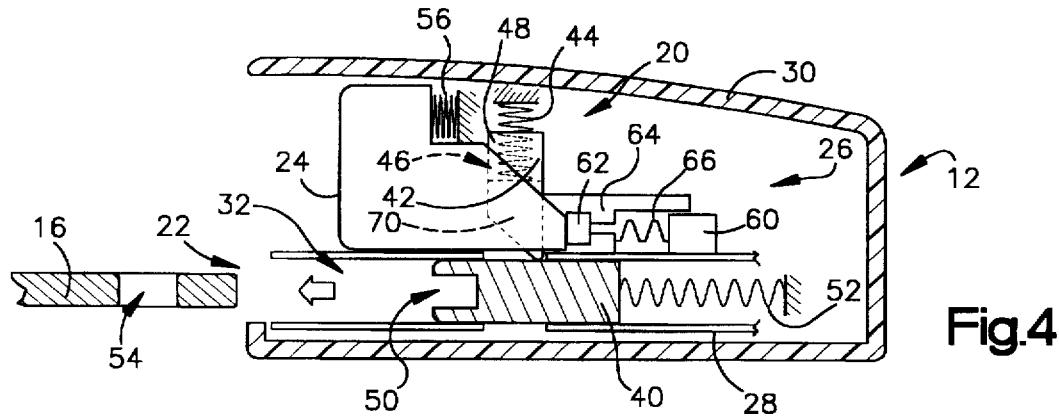

As shown in FIGS. 2–4, the buckle 12 includes a base 28 and a housing 30. The base 28 supports the latch mechanism 20 and the buckle switch 26 within the housing 30, and defines a passage 32 which receives the tongue 16.

The latch mechanism 20 may comprise any suitable structure capable of releasably interlocking with the tongue 16 in cooperation with the pushbutton 24. As shown by way of example in FIGS. 2–4, the latch mechanism 20 in the first embodiment of the present invention has a plurality of known parts including the pushbutton 24, an ejector 40, and a latch 42.

The latch 42, which is sometimes referred to as a locking bar, locking element, or the like, is movable between a non-locking position (FIG. 2) and a locking position (FIG. 3). A latch spring 44 engages the latch 42 at the bottom of a notch 46 in an upper portion 48 of the latch 42. The ejector 40 holds the latch 42 in the non-locking position against the bias the latch spring 44.

When the tongue 16 is inserted through the opening 22, as indicated by the arrow shown in FIG. 2, it is moved into engagement with the ejector 40 in a notch 50 at the end of the ejector 40. The tongue 16 is then moved inward against the ejector 40 so as to push the ejector 40 along the passage 32 from a forward position (FIG. 2) to a rearward position (FIG. 3) against the bias of an ejector spring 52.

As the tongue 16 and the ejector 40 approach the positions of FIG. 3, an aperture 54 in the tongue 16 moves into alignment with the latch 42. The latch spring 44 then moves the latch 42 downward (as viewed in the drawings) to the locking position through the aperture 54 in the tongue 16 so that the latch 42 blocks removal of the tongue 16 from the buckle 12.

When the tongue 16 is to be released from the buckle 12, the pushbutton 24 is moved from the position of FIGS. 2 and 3 to the position of FIG. 4 against the bias of a pushbutton spring 56. The pushbutton 24 engages, or may be linked with, the latch 42 in a known manner so as to move the latch 42 back out of the aperture 54 in the tongue 16 against the bias of the latch spring 44. The ejector spring 52 then moves the ejector 40 back outward along the passage 32 toward the opening 22 to eject the tongue 16 from the buckle 12.

As shown in FIGS. 2–4, the buckle switch 26 in the first embodiment of the present invention includes a Hall effect device 60, a magnet 62, and an armature structure 64. The Hall effect device 60 is fixed relative to the base 28 at a location spaced from the latch 42. The armature structure 64 conducts magnetic flux from the magnet 62 to the Hall effect device 60.

A spring structure 66 biases the armature structure 64 toward and against the latch 42. The armature structure 64 normally rests in a position adjoining the latch 42, but is supported for limited movement from the latch 42 toward the Hall effect device 60 against a bias of the spring structure 66. Such movement of the armature structure 64 may occur under the influence of vibrations imparted to the buckle 12 from other parts of the vehicle, as described below. The magnet 62 is mounted on the armature structure 64 for movement with the armature structure 64.

When the latch 42 is in the non-locking position of FIG. 2, the armature structure 64 abuts a lower portion 70 of the latch 42. This is best shown in the enlarged views of FIGS. 5A and 5B. The lower portion 70 of the latch 42 is more massive than the upper portion 48 which, as described above, has the notch 46. In this arrangement, the armature structure 64, the lower portion 70 of the latch 42, and an adjacent portion 72 of the base 28 define a path of least resistance for conduction of magnetic flux between the north and south poles 74 and 76 of the magnet 62. This is indicated generally by the arrows shown in FIG. 5A. A path of greater resistance is simultaneously defined by the armature structure 64, the Hall effect device 60, and the adjacent portion 72 of the base 28. This is indicated generally by the arrows shown in FIG. 5B. Accordingly, a preponderance of the magnetic flux provided by the magnet 62 is conducted along the path of FIG. 5A, with a lesser amount being conducted simultaneously along the path of FIG. 5B, when the latch 42 is in the non-locking position. As a result, the Hall effect device 60 has a low (or off) condition with a corresponding output when the tongue 16 is not locked in the buckle 12.

The spring structure 66 holds the armature structure 64 in abutment with the latch 42 such that the latch 42 slides against the armature structure 64 upon moving downward from the non-locking position of FIG. 2 to the locking position of FIG. 3. The spring structure 66 thus ensures that the armature structure 64 remains in contact with the latch 42. When the latch 42 reaches the locking position of FIG. 3, the armature structure 64 abuts the upper portion 48 of the latch 42 beside the notch 46. The mass of the upper portion 48 of the latch 42 is less than the mass of the armature structure 64 between the magnet 62 and the Hall effect device 60. Therefore, the armature structure 64, the Hall effect device 60, and the adjacent portion 72 of the base 28 define a path of least resistance for conduction of magnetic flux between the poles 74 and 76 of the magnet 62 when the latch 42 is in the locking position. This is indicated generally by the arrows shown in FIG. 6. A preponderance of the magnetic flux is then conducted along that path so that the Hall effect device 60 has a high (or on) condition with a corresponding output. The Hall effect device 60 is thus switched from a first condition with a first output to a second, different condition with a correspondingly different output upon locking of the tongue 16 in the buckle 12.

The buckle switch 26 is shown separately in FIGS. 7 and 8. As shown in detail in those views, the armature structure 64 includes upper and lower armatures 100 and 102. The spring structure 66 is part of a switch housing 80 which contains and supports the other parts 60, 62, 100 and 102 of the buckle switch 26 that are shown schematically in FIGS. 2–6. The housing 80 is a one-piece molded plastic structure with a front portion 82 and a rear portion 84. By "one-piece" it is meant that the housing 80 is made from a single homogenous material, and is a single unit exclusive of separate but joined elements. The spring structure 66 is an intermediate portion of the housing 80 which supports the front portion 82 for limited movement toward and away from the rear portion 84.

The magnet 62 and the armatures 100 and 102 are fixed to the front portion 82 of the housing 80. The Hall effect device 60 is located within the front portion 82 of the housing 80, but is fixed to the rear portion 84. When the buckle switch 26 is mounted on the base 28 (FIGS. 2–4), a retainer clip 86 holds the rear portion 84 of the housing 80 immovably on the base 28.

A printed circuit board 88 is fixed to the rear portion 84 of the housing 80, and projects forward from the rear portion 84 toward the front portion 82. A pair of leads 90 connect the Hall effect device 60 electrically with the printed circuit board 88. The Hall effect device 60 may comprise any suitable apparatus known in the art such as, for example, a differential Hall effect integrated circuit including a Hall transistor. The printed circuit board 88 processes the output of the Hall effect device 60 to provide a signal indicating the locked or unlocked condition of the buckle 12, and also may comprise any suitable structure known in the art.

The front portion 82 of the housing 80 has a pair of opposite side walls 92 and 94 which are interconnected by an inner wall member 95 (FIG. 7). An upper locator pin 96 projects upward from the inner wall member 95. A lower locator pin 98 projects oppositely downward from the inner wall member 95. The upper locator pin 96 extends into an aperture 104 in the upper armature 100 in an interference fit with the upper armature 100. The lower locator pin 98 likewise extends into an aperture 106 in the lower armature 102 in an interference fit with the lower armature 102.

The upper armature 100 is a rectangular bar extending longitudinally from the magnet 62 to the Hall effect device 60. More specifically, the upper armature 100 overlies the north pole 74 of the magnet 62, and projects partially over an upper side 108 of the Hall effect device 60. The lower armature 102 also is a rectangular bar, but is substantially shorter than the upper armature 100. The lower armature 102 thus extends longitudinally from the south pole 76 of the magnet 62 toward a lower side 110 of the Hall effect device 60, but does not reach the lower side 110 of the Hall effect device 60. As shown in FIG. 8, the armatures 100 and 102 have coplanar front end surfaces 112.

Figure 5A:
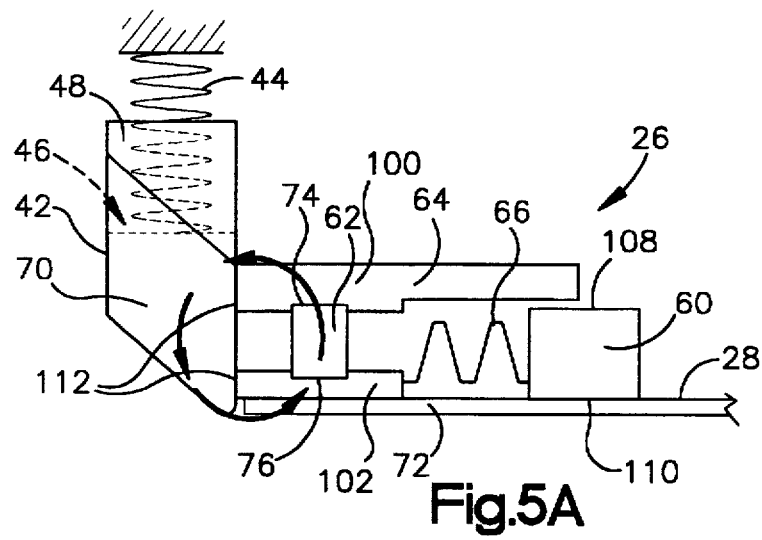
FIGS. 5A and 5B are enlarged partial views of parts shown in FIG. 2.
Figure 5B:
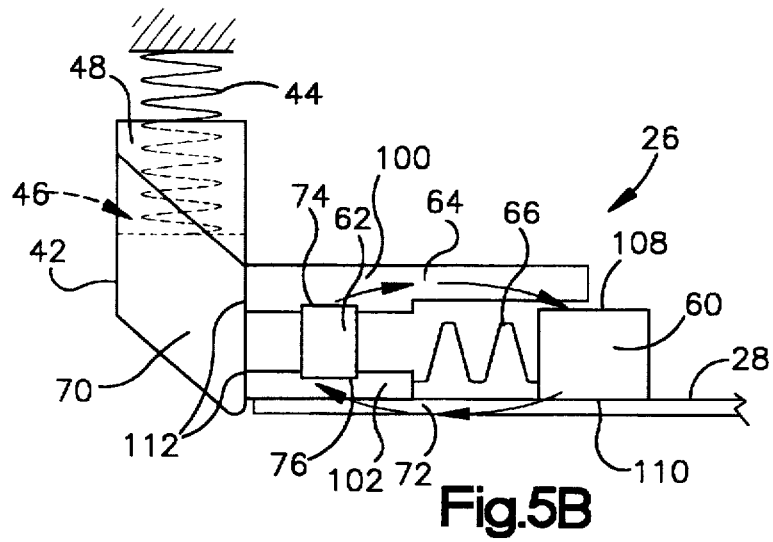
Figure 6:
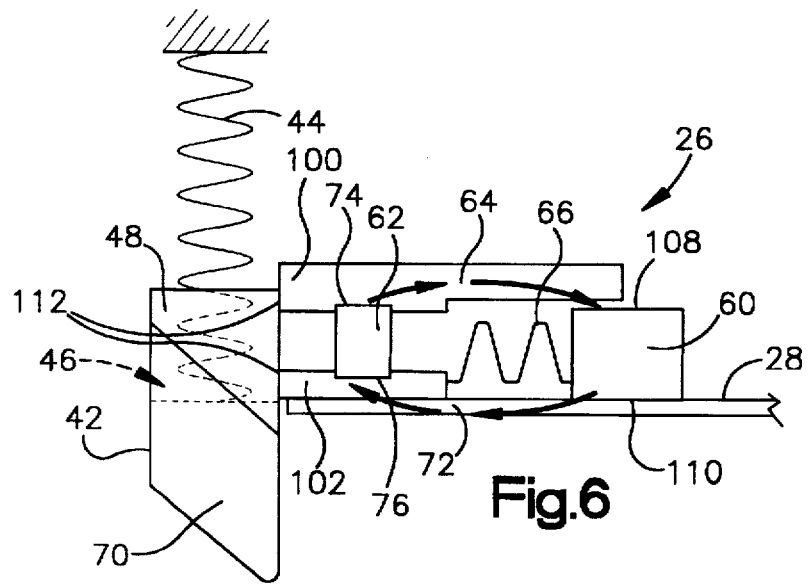
FIG. 6 is a view similar to FIGS. 5A and 5B showing parts in different positions.

The spring structure 66 holds the front end surfaces 112 of the armatures 100 and 102 against the latch 42, as shown schematically in FIGS. 5A, 5B and 6. As shown in detail in FIGS. 7 and 8, the spring structure 66 includes upper and lower spring members 130 and 132 in parallel between the front and rear portions 82 and 84 of the housing 80. The spring members 130 and 132 are generally V-shaped structures extending oppositely across the housing 80, and each includes first and second spring arms 140 and 142 in series between the front and rear portions 82 and 84 of the housing 80. The first and second spring arms 140 and 142 are deflected pivotally toward each other when the spring members 130 and 132 are compressed upon movement of the front portion 82 of the housing 80 toward the rear portion 84. The first and second spring arms 140 and 142 are deflected pivotally away from each other when the spring members 130 and 132 are extended upon movement of the front portion 82 of the housing 80 away from the rear portion 84. Moreover, the first spring arms 140 are normally prestressed so as to exert a preloading force which holds the armature structure 64 against the latch 42. The second spring arms 142 are normally slightly stressed.

The spring structure 66, the front portion 82 of the housing 80, and the parts that are fixed to the front portion 82 of the housing 80 together define a spring-mass system 150. The spring-mass system 150 is subject to resonance under the influence of vibrational forces imparted to the buckle 12 from other parts of the vehicle. In accordance with a particular feature of the present invention, the spring structure 66 restrains resonance vibration of the spring-mass system 150. This effect of the spring structure 66 is determined in part by the spring constants of the first and second spring arms 140 and 142, and in part by the natural frequencies of vibration provided by the first and second spring arms 140 and 142. Specifically, the first spring arms 140 both have a first spring constant, and together provide the spring-mass system 150 with a first natural frequency. The second spring arms 142 both have a second spring constant which is greater than the first spring constant, and together provide the spring-mass system 150 with a second, greater natural frequency. The first natural frequency is within a range of vibrational frequencies that the buckle 12 is expected to encounter during operation of the vehicle. The second natural frequency is greater than the upper limit of that range.

The first spring arms 140 deflect when the spring-mass system 150 is subjected to vibrational forces that meet or exceed the first spring constant. If the frequency of those vibrational forces is unequal to the first natural frequency (or harmonics of the first natural frequency), the spring-mass system 150 will not vibrate or resonate. If those vibrational forces have a frequency that is equal to the first natural frequency (or harmonics of the first natural frequency), and are in phase with the vibrations of the spring-mass system 150, then the spring-mass system 150 will begin to resonate. However, the spring members 130 and 132 have configurations that limit deflection of the first spring arms 140 to a total amount that is less than the maximum amount that might otherwise occur in resonance. This causes the vibrational forces that act on the first spring arms 140 at the first natural frequency to encounter the greater resistance offered by the second spring arms 142. Further deflection of the spring members 130 and 132 is then limited or blocked by the second spring arms 142.

In the preferred embodiment of the present invention, each of the first spring arms 140 has a first spring constant of about 1.2N/mm. The preloading force applied by the first spring arms 140 is about 1N. The first natural frequency is within the range of about 5 to about 200 Hz, and is most preferably about 110 Hz. Each of the second spring arms 142 has a second spring constant of about 8.4N/mm. The second natural frequency is about 290 Hz.

The buckle switch 26 can be used to alert a vehicle occupant to the locked or unlocked condition of the tongue 16 and buckle 12. For example, an audible alarm or a lamp on the vehicle instrument panel could be activated in response to the output of the Hall effect device 60 to alert a vehicle occupant if the tongue 16 is not locked in the buckle 12.

The buckle switch 26 can also be used to control one or more vehicle occupant protection devices. For example, as shown schematically in the block diagram of FIG. 9, the buckle switch 26 is included in a deployment system 200 with an inflatable vehicle occupant protection device 202. The deployment system 200 further includes a crash sensor 204, a controller 206, and a source 208 of inflation fluid. A vent 210 is interposed between the source 208 of inflation fluid and the inflatable device 202.

The inflatable device 202 can be any one of several different types of inflatable vehicle occupant protection devices known in the art. Such inflatable devices include air bags, inflatable seat belts, inflatable knee bolsters, inflatable head liners, and knee bolsters operated by air bags, and/or seat belt pretensioners.

The crash sensor 204 may comprise any known apparatus for sensing a vehicle condition that indicates the occurrence of a crash. Such a vehicle condition may comprise sudden deceleration, transverse acceleration or crushing of a side portion of a vehicle, a vehicle rollover, or the like. If the crash-indicating condition is at or above a predetermined threshold level, it indicates the occurrence of a crash or other event for which deployment of the inflatable device 202 is desired to help protect an occupant of the vehicle. The crash sensor 204 then provides a deployment signal to the controller 206.

When the controller 206 receives a deployment signal from the crash sensor 204, it responds by actuating the fluid source 208 to initiate inflation of the inflatable device 202. The controller 206 further responds to the output of the Hall effect device 60 in the buckle switch 26 by operating the vent 210 in accordance with the locked or unlocked condition of the tongue 16 and buckle 12. If the output of the Hall effect device 60 indicates that the tongue 16 is not locked in the buckle 12, the controller 106 causes the vent 210 to direct a first amount of inflation fluid away from the inflatable device 202. The inflatable device 202 is then deployed in a first mode for protection of a vehicle occupant who is not restrained by the seat belt webbing 14. If the output of the Hall effect device 60 indicates that the tongue 16 is locked in the buckle 12, the controller 206 causes the vent 210 to direct a second, different amount of inflation fluid away from the inflatable device 202. The inflatable device 202 is then deployed in a second, different mode for protection of a vehicle occupant who is restrained by the seat belt webbing 14. A similar result could be achieved by replacing the vent 210 with multiple fluid sources 208 or a fluid source 208 with multiple outputs.

A second embodiment of the present invention is shown partially in the block diagram of FIG. 10. The second embodiment comprises another example of an apparatus that can be operated in differing modes in accordance with the present invention. The second embodiment thus comprises a vehicle occupant protection apparatus 300 including a plurality of vehicle occupant protection devices 302, 304 and 306. In addition to the protection devices 302, 304 and 306, the apparatus 300 includes a controller 308, a crash sensor 310, and a buckle switch 312 in accordance with the present invention. Like the buckle switch 26 described above, the buckle switch 312 includes a Hall effect device that provides a first output if a seat belt tongue is not locked in a buckle and a second, different output if a seat belt tongue is locked in the buckle.

Each of the protection devices 302, 304 and 306 can be an inflatable device, a seat belt pretensioner, a seat belt retractor lock, or any other device that is actuated for protection of a vehicle occupant. When the controller 308 receives an appropriate signal from the crash sensor 310, it actuates one or more of the protection devices 302, 304 and 306 in a first mode if the Hall effect device in the buckle switch 312 provides the first output. The controller 308 actuates one or more of the protection devices 302, 304 and 306 in a second, different mode if the Hall effect device in the buckle switch 312 provides the second output.

Each mode of actuation for the protection devices 302, 304 and 306 may comprise simultaneous or sequential actuation of the protection devices 302, 304 and 306 with a predetermined timing. Each mode of actuation may alternatively comprise actuation of less than all of the protection devices 302, 304 and 306. For example, if the protection devices 302, 304, and 306 include a pretensioner, a retractor lock, or another device that functions to help control tension in the seat belt webbing, it may be preferable not to actuate that protection device if the Hall effect device in the buckle switch 312 indicates that the tongue is not locked in the buckle. Moreover, if the protection devices 302, 304 and 306 include an inflatable device, each mode of actuation may comprise the use of one or more inflation pressure control devices like the vent 210 described above with reference to FIG. 9. The first and second modes could also differ from each other by the use of a fluid source that operates in different stages to provide inflation fluid in correspondingly different amounts (with or without venting) or at correspondingly different times, and/or by providing multiple sources of inflation fluid that are operative selectively.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:
   a latch which is movable from a non-locking position to a locking position in which said latch engages a seat belt tongue;
   a Hall effect device;
   a magnet having north and south poles;
   an armature structure which conducts magnetic flux from said magnet to said Hall effect device, said armature structure contacting said magnet at said poles; and
   a spring structure which biases said armature structure into sliding contact with said latch during movement of said latch between said non-locking and locking positions, whereby said latch affects said magnetic flux conducted by said armature structure so as to cause said Hall effect device to have a first output when said latch is in said non-locking position and a second, different output when said latch is in said locking position.

2. Apparatus as defined in claim 1 wherein said spring structure comprises first and second spring sections in series with each other.

3. Apparatus as defined in claim 2 wherein said first spring section is normally prestressed and said second spring section is normally slightly stressed.

4. Apparatus as defined in claim 2 wherein first spring section has a first spring constant and said second spring section has a second, greater spring constant.

5. Apparatus as defined in claim 2 wherein said first spring section is one of a pair of first sections of said spring structure that are in parallel with each other, said second spring section being one of a pair of second sections of said spring structure that are in parallel with each other.

6. Apparatus as defined in claim 2 wherein said first spring section supports said armature structure for vibration relative to said latch at a first resonance frequency, said second spring section supporting said armature structure for vibration relative to said latch at a second, greater resonance frequency.

7. Apparatus as defined in claim 6 wherein said first resonance frequency is within the range of about 5 Hz to about 200 Hz and said second resonance frequency is greater than about 200 Hz.

8. Apparatus as defined in claim 7 wherein said first resonance frequency is about 110 Hz and said second resonance frequency is about 290 Hz.

9. Apparatus as defined in claim 1 wherein said armature structure is movable relative to said Hall effect device against a bias of said spring structure.

10. Apparatus as defined in claim 9 further comprising a base defining a passage in which said latch engages a seat belt tongue, said Hall effect device being fixed relative to said base.

11. Apparatus as defined in claim 1 wherein said spring structure is defined by portions of a housing containing said Hall effect device, said magnet, and said armature structure.

12. Apparatus as defined in claim 11 wherein said housing is a one-piece molded plastic structure.

13. Apparatus as defined in claim 2 wherein said spring structure comprises a generally V-shaped structure having first and second arms respectively comprising said first and second spring sections.

14. Apparatus as defined in claim 1 wherein said magnet is mounted on said armature structure and is movable with said armature structure relative to said Hall effect device against a bias of said spring structure.

15. Apparatus comprising:
   a latch which is movable from a non-locking position to a locking position in which said latch engages a seat belt tongue;
   a Hall effect device;
   a magnet having a north pole and a south pole;
   an armature structure which conducts magnetic flux from said magnet to said Hall effect device; and
   a spring structure which biases said armature structure into sliding contact with said latch during movement of said latch between said non-locking and locking positions, whereby said latch affects said magnetic flux conducted by said armature structure so as to cause said Hall effect device to have a first output when said latch is in said non-locking position and a second, different output when said latch is in said locking position;
   said armature structure including a first armature which conducts said magnetic flux from said north pole of said magnet and further including a second armature which conducts said magnetic flux to said south pole of said magnet.

16. Apparatus as defined in claim 15 wherein said first armature extends from said north pole of said magnet to said Hall effect device, said second armature being smaller than said first armature and being spaced from said Hall effect device.

17. Apparatus as defined in claim 16 further comprising a metal base defining a passage in which the seat belt tongue engages said latch, said base having a portion which conducts said magnetic flux from said Hall effect device to said second armature.

* * * * *